United States Patent [19]

Barton

[11] Patent Number: 4,995,761

[45] Date of Patent: Feb. 26, 1991

[54] METHOD AND APPARATUS FOR REPAIRING RUPTURES IN UNDERGROUND CONDUITS

[76] Inventor: Kenneth S. Barton, 3921 Prospect Ave., Naples, Fla. 33942

[21] Appl. No.: 397,771

[22] Filed: Aug. 23, 1989

[51] Int. Cl.$^5$ .......................... F16L 1/00; F16L 55/18
[52] U.S. Cl. .................................. 405/154; 405/303; 138/97
[58] Field of Search .................. 405/154, 156; 138/97; 156/156

[56] References Cited

U.S. PATENT DOCUMENTS

| | | | |
|---|---|---|---|
| 2,583,316 | 1/1952 | Bannister | 138/97 X |
| 2,672,162 | 3/1954 | Braver | 138/97 |
| 3,195,618 | 3/1965 | Lang et al. | 166/63 |
| 3,762,446 | 10/1973 | Tungseth et al. | 138/97 |
| 3,830,260 | 8/1974 | Baviello | 138/97 |
| 3,834,421 | 9/1974 | Daley | 138/97 |
| 4,581,085 | 4/1986 | Wood | 156/156 |
| 4,723,579 | 2/1988 | Hyodo et al. | 138/97 X |

Primary Examiner—Dennis L. Taylor
Attorney, Agent, or Firm—William E. Noonan

[57] ABSTRACT

An apparatus and method are disclosed for repairing ruptures in underground conduits. An inflatable bladder and a flexible sleeve that is wrapped about at least a portion of the bladder are introduced into a conduit proximate a rupture therein. The bladder is inflated to urge the sleeve into engagement with the conduit such that the sleeve covers the rupture. The sleeve includes an adhesive bonding substance that adheres the sleeve to the conduit and is hardenable to bond the sleeve to the conduit.

21 Claims, 4 Drawing Sheets

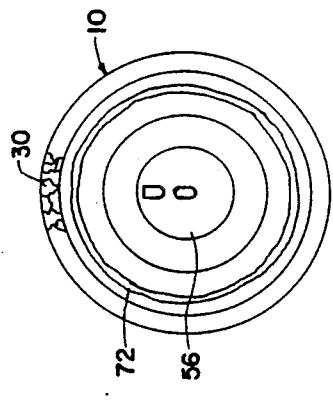
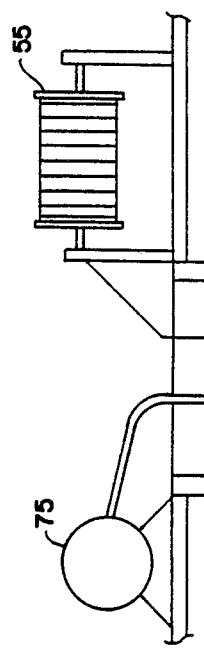
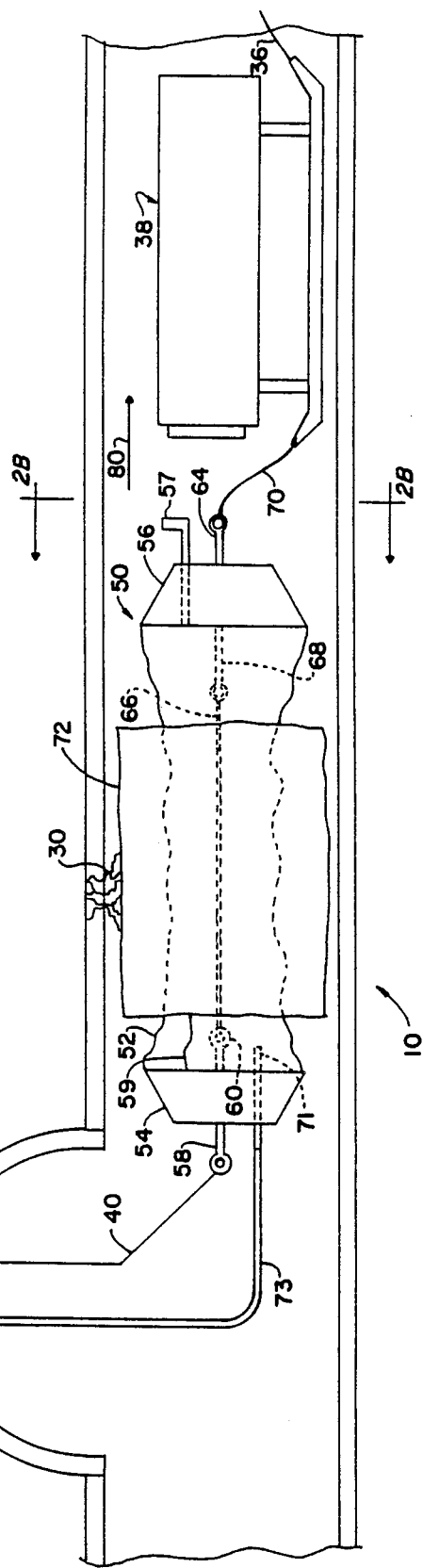
Fig. 2B
Fig. 2A

METHOD AND APPARATUS FOR REPAIRING RUPTURES IN UNDERGROUND CONDUITS

FIELD OF THE INVENTION

This invention relates to a method and apparatus for repairing cracks and other ruptures in underground conduits such as sewer lines, telephone conduits and other non-pressurized underground pipes.

BACKGROUND OF THE INVENTION

When ruptures or cracks occur in underground conduits such as sewer lines, telephone conduits and other non-pressurized underground pipes, it is much less costly to repair these conduits in situ than it is to excavate them for repair or replacement. One known method of in situ conduit repair involves introducing an inflatable, resin coated pipe into the conduit and inflating that pipe with hot, flowing air. The inflated pipe bonds to the ruptured host conduit and is allowed to cure. At the same time, the uncured resin permeates the cracks in the host pipe.

The technique described above suffers from several disadvantages. First, the inflated pipe typically extends from manhole to manhole and is applied to undamaged, as well as ruptured sections, of the conduit. As a result, unnecessary time, material and effort are expanded. And because the cost of the repair is dictated by the linear footage which is patched, this type of repair can prove unduly expansive. Currently, at an expense of approximately $100 per linear foot, it may cost $20,000 to $40,000 to repair a damaged pipe, even where only a very small portion of that pipe is ruptured. Additionally, by patching the entire run of pipe between adjacent manholes, the contractor often covers the discharge openings of pipes which empty into the conduit being repaired. These openings must then be recut by a hydrojet cutter, a water cannon or a grinder. As a result, the cost, time and complexity of the conduit repair operation are increased even further. Additionally, the recutting operation can leave rough edges which can cause leaking, obstructions and other problems in the future.

SUMMARY OF THE INVENTION

It is therefore an object of this invention to provide a method and apparatus for repairing ruptured underground conduits which permit discrete, predetermined segments of underground pipe to be repaired more simply, quickly and inexpensively than with prior techniques.

It is a further object of this invention to provide a method and apparatus for repairing only the ruptured sections of an underground conduit, while bypassing undamaged sections of the conduit.

It is a further object of this invention to provide a method and apparatus for repairing ruptures in underground conduits which do not cover discharge openings into the conduit and therefore do not require the reformation of new discharge openings.

This invention results from a realization that ruptured underground conduits can be repaired much more quickly and much less inexpensively by patching only the discrete ruptured sections of the pipe, while bypassing the undamaged sections. These beneficial results are achieved by the present invention which features an apparatus for repairing ruptures in underground conduits. The apparatus includes an inflatable bladder, which is introducible into a conduit, proximate a rupture therein. A flexible sleeve is wrapped about at least a portion of the bladder. The sleeve is sufficiently large to cover the rupture. There are means for inflating the bladder to urge the sleeve into engagement with the conduit such that the sleeve covers the rupture. The sleeve includes an adhesive bonding substance that adheres the sleeve to the conduit and is hardenable to bond the sleeve to the conduit.

In a preferred embodiment there are means for removing the bladder from the sleeve after the bonding substance has hardened. The means for removing may include winch means and cable means interconnecting the winch means and the first plug for selectively removing the bladder from the sleeve. The bladder is preferably elongate and the sleeve may extend for at least a portion of the length of the bladder. The bladder may include first and second plug elements formed at the respective ends of the bladder. There may be means disposed centrally through the bladder for interconnecting the first and second plug elements. Means may be provided for releasably attaching the sleeve to the bladder. In particular, means may be provided for releasably attaching the first plug element to the bladder.

The means for inflating may include pump means and hose means which interconnect the pump means and the bladder. The pump means may be reversible to selectively deflate the bladder for removal from the sleeve. Means may be provided for regulating pressure in the bladder.

A ruptured underground conduit may be repaired using the above described apparatus. A hardenable adhesive bonding substance is applied to the flexible sleeve and that sleeve is wrapped about a portion of an inflatable bladder. The bladder and the sleeve are then introduced into the conduit proximate the rupture to be repaired. The bladder is inflated to urge the sleeve into engagement with the conduit such that the sleeve adheres to the conduit to cover the rupture. The hardenable bonding substance is then allowed to harden to bond the sleeve to the conduit.

The outer surface of the bladder may be lubricated to facilitate removal of the bladder from the sleeve. After the bonding substance hardens, the bladder may be deflated to facilitate removal of the bladder from the sleeve. By heating the sleeve after it is urged into engagement with the conduit, hardening of the bonding substance is accelerated. Prior to introduction of the apparatus into the conduit, the rupture to be repaired may be surveyed. The bladder and the sleeve may be formed to extend slightly longer than the length of the rupture. The sleeve is preferably constructed to be shorter than the length of the bladder. The length of the bladder and the sleeve can be inexpensively and quickly adjusted to fit the length of each particular rupture.

DISCLOSURE OF PREFERRED EMBODIMENT

Other objects, features and advantages will occur from the following description of a preferred embodiment and the accompanying drawings, in which;

FIG. 2A is a simplified elevational view, with the conduit cut away and the ground broken to indicate depth, of the apparatus for repairing the rupture according to this invention;

FIG. 2B is a cross sectional view taken along line 2B—2B of FIG. 2A;

Figure 1:
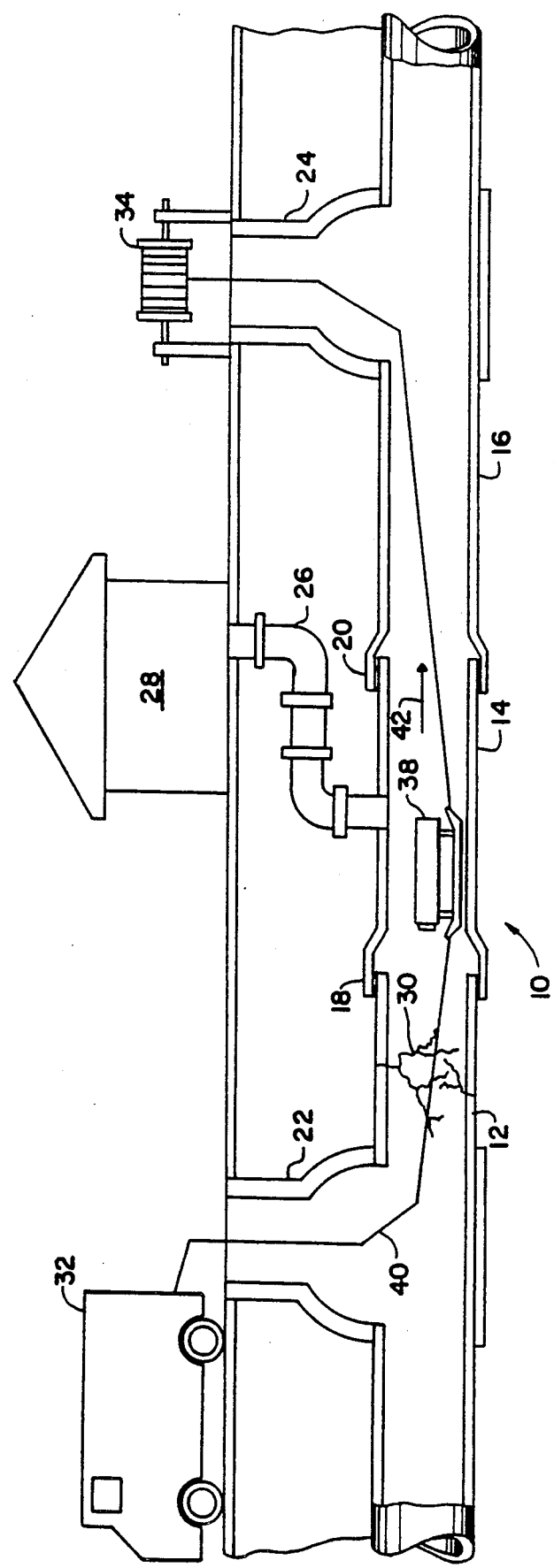
FIG. 1 is an elevational, cut away schematic view of an underground conduit having a rupture to be repaired according to the method and apparatus of this invention.

There is shown in FIG. 1 an underground conduit 10 which includes conduit sections 12, 14 and 16. The conduit sections are engaged and attached in a conventional manner. For example, the end of conduit section 12 fits into a bell-shaped opening 18 in conduit section 14. Similarly, the opposite end of section 14 fits into a bell-shaped opening 20 in conduit section 16. Conduit 10 may be a sewer pipe or other type of non-pressurized pipe or underground conduit. Manholes 22 and 24 disposed periodically along conduit 10 provide access from the ground level into the conduit. A discharge pipe 26 extends from a building 28 into section 14 of conduit 10. Pipe 26 enables waste from building 28 to discharge into conduit 10 in a conventional manner.

Problems arise when a crack 30 forms, for example, in section 12 of conduit 10. This crack or rupture may allow water to leak into or out of conduit 10 and may eventually lead to further deterioration of the conduit. Accordingly, it is important that the rupture be promptly surveyed and repaired.

Before repairs are performed, conduit 10 is cleaned to prepare the rupture for patching in accordance with this invention. The conduit is then surveyed to determine the extent and location of the rupture. To accomplish these tasks, a repair vehicle 32 is positioned proximate the entrance of manhole 22. A winch 34 and a cable 36 that is operated by the winch are placed proximate manhole 24 such that the cable extends into the manhole. Conduit 10 is first cleaned by a conventional hydrocleaning apparatus, which is not shown. That apparatus extends through manhole 22 and through conduit 10. It cleans the walls of the conduit and siphons out the dirt and debris that are cleaned form the walls. The cleaner extends through conduit 10 until it reaches a point proximate the loose end of cable 36. Cable 36 is attached by operating personnel in a conventional manner to the cleaning device and that device is withdrawn back through conduit 10 and out of manhole 22 to repair vehicle 32. As a result, cable 36 extends through the conduit from winch 34 to repair vehicle 32.

Next, a conventional underground rupture surveying camera 38 is attached to the end of cable 36. At the same time, a second cable 40 is connected between camera 38 and a conventional winch, not shown in FIG. 1, located in vehicle 32. Winch 34 is operated so that cable 36 draws camera 38 through conduit 10 in the direction of arrow 42. As a result, camera 38 surveys the interior of conduit 10 and ascertains the location of rupture 30. A visual image of the pipe is typically viewed on a monitor within vehicle 32.

After the location of rupture 30 is ascertained, the rupture is repaired in accordance with this invention. First, cable 40 is drawn by a winch 55, FIG. 2A, back into vehicle 32 so that camera 38 is drawn to the vehicle. Cable 40 is removed from camera 38 and a repair apparatus 50 is connected to the end of cable 40. In particular, apparatus 50 includes an elongate deflated bladder 52 having a first plug 54 at its trailing end and a second plug 56 at its leading end. Bladder 52 is typically composed of a resilient, flexible material such as rubber or various types of plastic which may be conveniently inflated and deflated. Plug elements 54 and 56 are typically composed of a harder elastomeric or plastic substance. The plugs 54 and 56 are connected in any air tight manner to opposing open ends of bladder 52. An eye bolt 58 is formed through plug 54. The outer end of eye bolt 58 is attached to the distal end of cable 40. The inner end 60 of eye bolt 58 extends within bladder 52. A similar eye bolt 64 extends through plug 56. A cable 66 interconnects the inner end 68 of eye bolt 64 with inner end 60 of eye bolt 58. As a result, the plug elements 54 and 56 are interconnected and when either plug is pulled through the conduit, as described below, the other plug is likewise pulled by cable 66 in a similar direction. The outer end of eye bolt 64 is connected by a cable 70 to camera 38.

An air inlet 71 is formed through plug 54. A hose 73 is interconnected between inlet 71 and a conventional pump 75. Cable 40 is operated by a winch 55 which permits the cable to be drawn into and withdrawn from the vehicle 32. Both winch 55 and pump 75 may be disposed within the vehicle, which is not shown in FIG. 2A. A pressure relief valve 57 is formed through plug 56.

A flexible sleeve 72 is wrapped about bladder 52. Sleeve 72 is composed of fiberglass, or alternative flexible, long lasting materials which are suitable for patching cracks and ruptures.

Bladder 52 and sleeve 72 are typically constructed after camera 38 has surveyed rupture 30 and been drawn out through manhole 22. At this point, the operator is aware of the approximate size and location of rupture 30. Accordingly, bladder 52 is made sufficiently long so that it extends somewhat longer (e.g. approximately six feet on either side) than the length of rupture 30. Sleeve 72 is cut so that it is slightly longer than rupture 30. For example, the sleeve may be long enough to overlap rupture 30 by approximately three feet on either side. The outer surface of bladder 52 is lubricated by a conventional lubricant such as pipe soap to facilitate removal of the bladder from the sleeve, as described more fully below.

Figure 3:
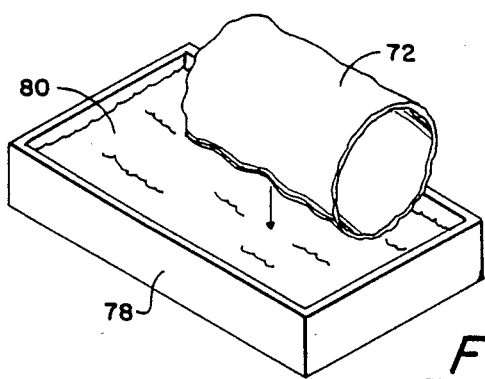
FIG. 3 is an isometric view of an adhesive hardenable resin being applied to the flexible sleeve.

After sleeve 72 has been cut to its desired length, an adhesive, hardenable bonding material, such an epoxy resin, is applied to the sleeve. As shown in FIG. 3, sleeve 72 may be dipped into a container 78 that holds bonding substance 80. Alternatively, the bonding material 80 may be applied to the sleeve by or brushing, spraying or other techniques. After the bonding substance is applied, sleeve 72 is fitted over bladder 52 such that the bladder extends through the sleeve. One or more segments of break away thread 59 are interconnected between plug 54 and sleeve 72. As a result, the sleeve remains attached to bladder 52 as apparatus 50 is being introduced into conduit 10 as described below. Apparatus 50 is completed by inserting inlet 71 through a preformed hole in plug 54, fastening hose 73 to inlet 71 and attaching cable 40 to eye bolt 58. Cable 70 is interconnected between camera 38 and eye bolt 64. Then, winch 34, FIG. 1, is operated to draw camera 38 and apparatus 50 into conduit 10 through manhole 22 into the position shown in FIG. 2A. Winch 55 is released so that the cable 40 is drawn into the conduit. Hose 73 is sufficiently long to extend the required length into the conduit.

Figure 4A:
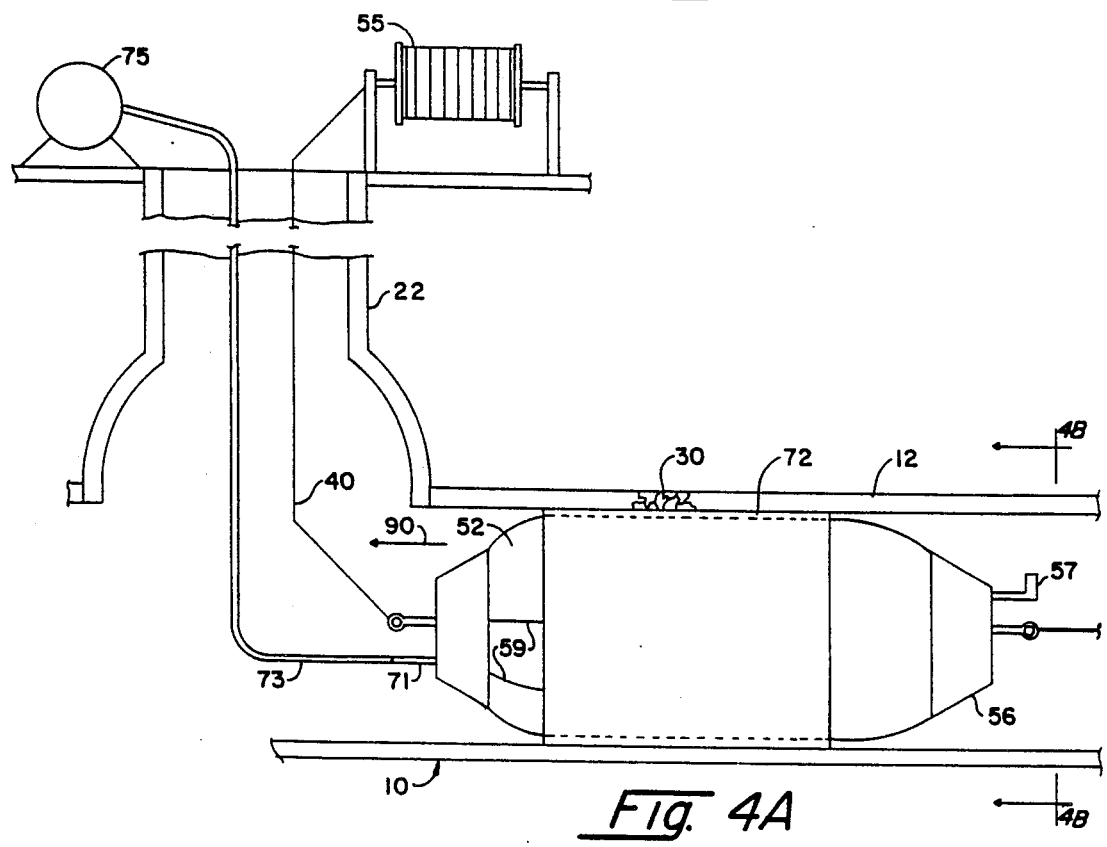
FIG. 4A is a view similar to FIG. 2A of the apparatus with the bladder in an inflated condition such that the sleeve is urged against the section of conduit to be repaired.
Figure 4B:
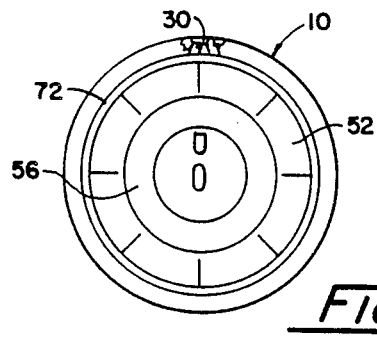
FIG. 4B is a cross sectional view taken along line 4B—4B of FIG. 4A.

The entire apparatus 50 is drawn in the direction of arrow 80, FIG. 2A, until it is positioned adjacent to rupture 30. The correct positioning is detected by camera 38. Sleeve 72 is positioned proximate rupture 30 so that the sleeve extends slightly beyond the edges of the rupture. As shown in FIGS. 2A and 2B, sleeve 72 is limp and encircles the deflated bladder 52. With apparatus 50 positioned as shown in FIGS. 2A and 2B, bladder 52 is inflated. Pump 75 is operated from inside vehicle 32 so that air is pumped through hose 73 and inlet 71 into bladder 52. This causes the bladder to inflate into the condition shown in FIG. 4A. This urges sleeve 72 into engagement with conduit section 12 such that sleeve 72 covers rupture 30. The adhesive bonding substance on sleeve 72 allows the sleeve to adhere to the walls of conduit section 12. The bonding substance is allowed to harden so that sleeve 72 eventually bonds to conduit section 12. Curing of the sleeve may be accelerated by pumping hot air through hose 73 into inflated bladder 52. Pressure relief valve 57 opens automatically to release excess air so that bladder 52 does not overinflate. That valve also allows the hot air to circulate through and fill bladder 52.

After sleeve 72 has hardened and bonded to the walls of conduit section 12, bladder 52 is removed from conduit 10. First, the bladder may be deflated by reversing pump 75 so that air is drawn out of the bladder through hose 73. Alternatively, air may be released from the bladder by means such as a pressure relief valve located on or proximate the pump. The lubricant on the outer surface of bladder 52 allows the deflating bladder to separate from the sleeve 72 which has now hardened and bonded to the inner wall of conduit section 12. After bladder 52 has deflated, winch 55 is operated to draw cable 40 up through manhole 22. As a result, threads 59 are broken and the deflated bladder is drawn in the direction of arrow 90. The bladder is thus removed from the hardened, bonded sleeve 72 and it pulls camera 38 through the sleeve and up manhole 22, as shown in FIG. 5A.

Figure 5A:
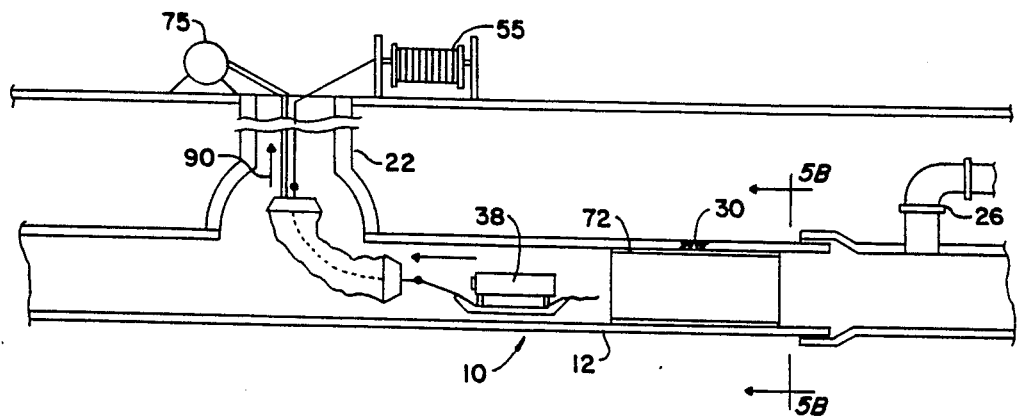
FIG. 5A is an elevational, cut away, schematic view of the deflated bladder being removed from the sleeve after the sleeve is bonded to the ruptured conduit.
Figure 5B:
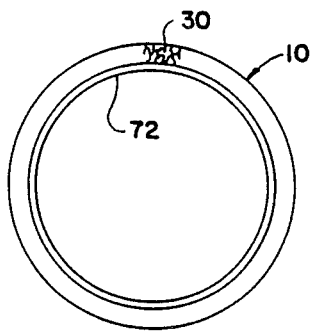
FIG. 5B is a cross sectional view taken along lines 5B—5B of FIG. 5A.

Bonded sleeve 72 serves as a patch which seals and repairs rupture 30 in conduit section 12, FIGS. 5A and 5B. The patch extends only slightly beyond the longitudinal ends of rupture 30. Unlike prior techniques, the entire conduit 10 is not sealed. This saves considerable time, material and money. Moreover, because only a relatively small portion of conduit 10 requires repair, the discharge pipe 26 is not covered. As a result, there is not need to undergo the complexity and expense of forming a new opening in pipe 26.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. Apparatus for repairing ruptures in underground conduits comprising:
   an inflatable bladder that is introducible into a generally cylindrical conduit proximate a rupture therein, said bladder having a generally smooth surface in its inflated condition;
   a flexible annular sleeve that is wrapped about and directly engageable by at least a portion of said bladder and is sufficient large to cover said rupture; and
   means for inflating said bladder to urge said sleeve into generally conforming engagement with the entire inner circumferential surface of at least a section of said conduit such that said sleeve covers said rupture, said sleeve including an adhesive bonding substance that adheres said sleeve to said conduit and is hardenable to bond said sleeve to said conduit.

2. The apparatus of claim 1 further including means for removing said bladder from said sleeve after said bonding substance has hardened.

3. The apparatus of claim 1 in which said bladder is elongate and said sleeve extends for at least a portion of the length of said bladder.

4. The apparatus of claim 3 in which said bladder includes first and second plug elements formed at respective ends of said bladder.

5. The apparatus of claim 4 further including means disposed centrally through said bladder for interconnecting said first and second plug elements.

6. The apparatus of claim 1 further including means for releasably attaching said sleeve to said bladder.

7. The apparatus of claim 4 further including means for releasably attaching said first plug element to said bladder.

8. The apparatus of claim 1 in which said means for inflating include pump means and hose means interconnecting said pump means and said bladder.

9. The apparatus of claim 8 in which said pump means are reversible to selectively deflate said bladder for removal from said sleeve.

10. The apparatus of claim 1 further including valve means for selectively releasing air to deflate said bladder.

11. The apparatus of claim 1 further including means for regulating the pressure in said bladder.

12. The apparatus of claim 2 in which said means for removing include winch means and cable means interconnecting said winch means and said bladder for selectively removing said bladder from said sleeve.

13. A method of repairing a rupture in a generally cylindrical underground conduit, comprising the steps of:
   applying a hardenable, adhesive bonding substance to a flexible annular sleeve;
   wrapping said flexible sleeve circumferentially about at last a portion of an inflatable bladder with said bladder in a deflated condition outside of the conduit, said bladder having a generally smooth outer surface in its inflated condition;
   introducing said bladder and said sleeve into a cylindrical conduit, proximate said rupture to be repaired;
   inflating said bladder to urge said sleeve into generally conforming engagement with the entire inner circumferential surface of at least a section of said conduit such that said sleeve adheres to said conduit to cover said rupture; and
   allowing said hardenable bonding substance to harden to bond said sleeve to said conduit.

14. The method of claim 20 further including removing said bladder from said sleeve after said bonding substance has hardened to provide a repaired conduit.

15. The method of claim 20 further including lubricating the outer surface of said bladder to facilitate removal of said bladder from said sleeve.

16. The method of claim 14 further including deflating said bladder after said bonding substance hardens to facilitate removal of said bladder from said sleeve.

17. The method of claim 20 further including heating said sleeve after it is urged into engagement with said conduit to accelerate hardening of said bonding substance.

18. The method of claim 20 further including the steps of initially surveying the rupture to be repaired and then forming said bladder and said sleeve to extend slightly longer than the length of said rupture.

19. The method of claim 18 in which said sleeve is formed to be shorter than the length of said bladder.

20. Apparatus for repairing ruptures in underground conduits comprising:
   an inflatable elongate bladder that is introducible into a generally cylindrical conduit proximate a rupture therein, said bladder having a generally smooth surface in its inflated condition and further including first and second plug elements formed at respective ends thereof;
   means disposed centrally through said bladder for interconnecting said first and second plug elements such that movement of one of said plug elements in a direction away from the other said plug element pulls said other plug element in said direction;
   a flexible annular sleeve that is wrapped about and extends for at least a portion of said bladder and is sufficiently large to cover said rupture; and
   means for inflating said bladder to urge said sleeve into generally conforming engagement with the entire inner circumferential surface of at least a section of said conduit such that said sleeve covers said rupture, said sleeve including an adhesive bonding substance that adheres said sleeve to said conduit and is hardenable to bond said sleeve to said conduit.

21. Apparatus for repairing ruptures in underground conduits comprising:
   an inflatable elongate bladder that is introducible into a generally cylindrical conduit proximate a rupture therein, said bladder having a generally smooth surface in its inflated condition;
   a flexible annular sleeve that is wrapped about and extends for at least a portion of said bladder and is sufficiently large to cover said rupture;
   means for inflating said bladder to urge said sleeve into generally conforming engagement with the entire inner circumferential surface of at least a section of said conduit such that said sleeve covers said rupture, said sleeve including an adhesive bonding substance that adheres said sleeve to said conduit and is hardenable to bond said sleeve to said conduit; and
   means for removing said bladder from said sleeve after said bonding substance has hardened including winch means and cable means for interconnecting said winch means and said bladder.

* * * * *